Jan. 4, 1949.  G. C. SALMONS ET AL  2,457,925
AERIAL CABLE CUTOUT
Filed March 17, 1947  3 Sheets-Sheet 1
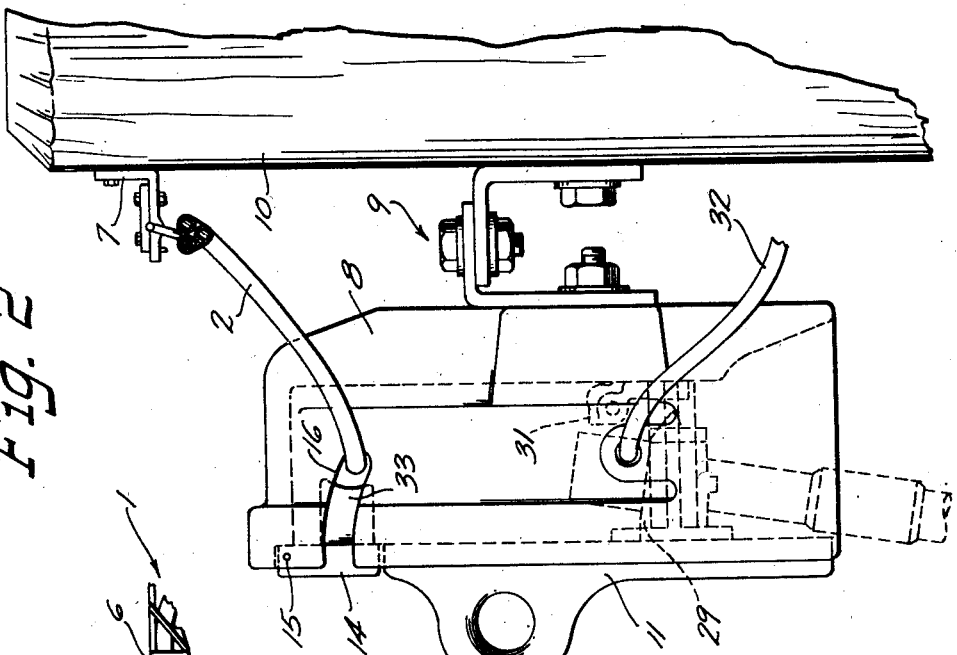
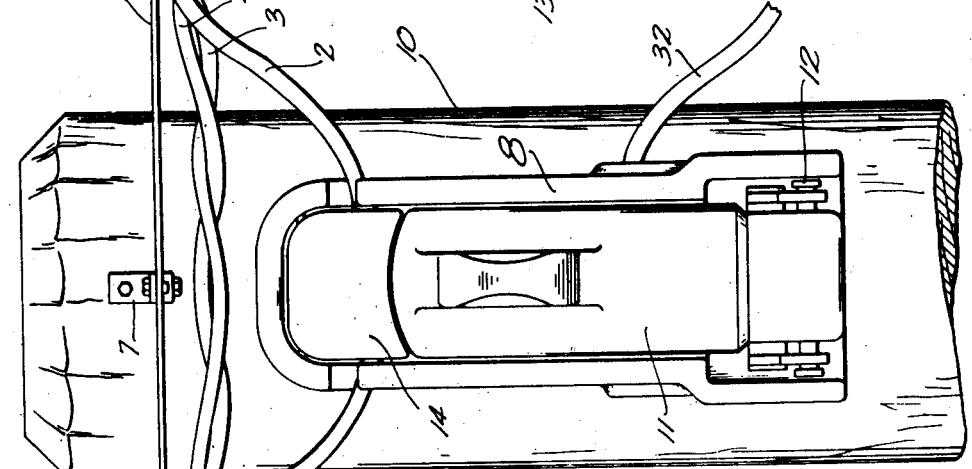
INVENTORS.
George C. Salmons &
BY Leo J. Dornbos
Arthur R. Woolfolk
Attorney

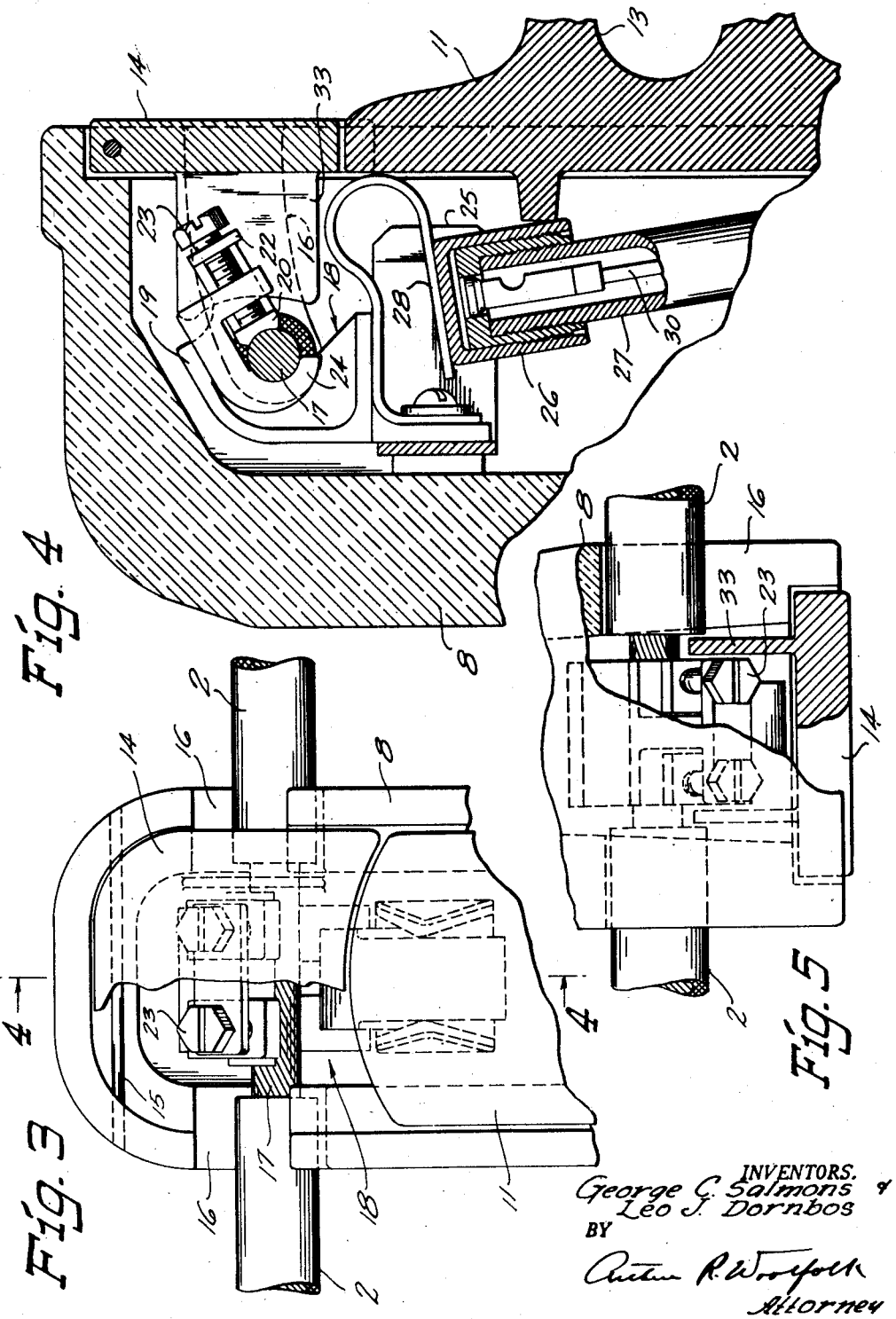

Jan. 4, 1949.  G. C. SALMONS ET AL  2,457,925
AERIAL CABLE CUTOUT
Filed March 17, 1947  3 Sheets-Sheet 3
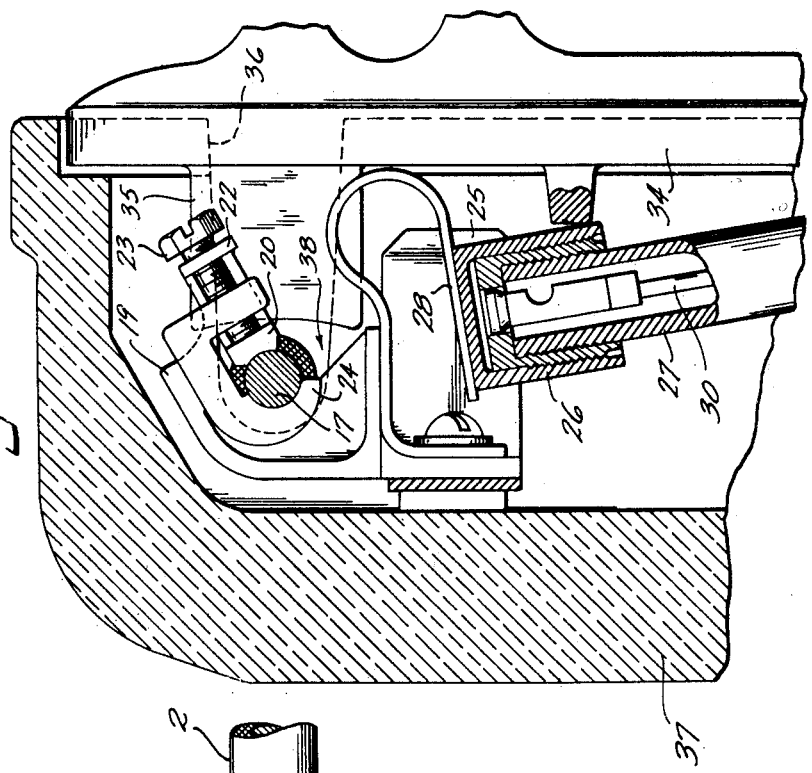
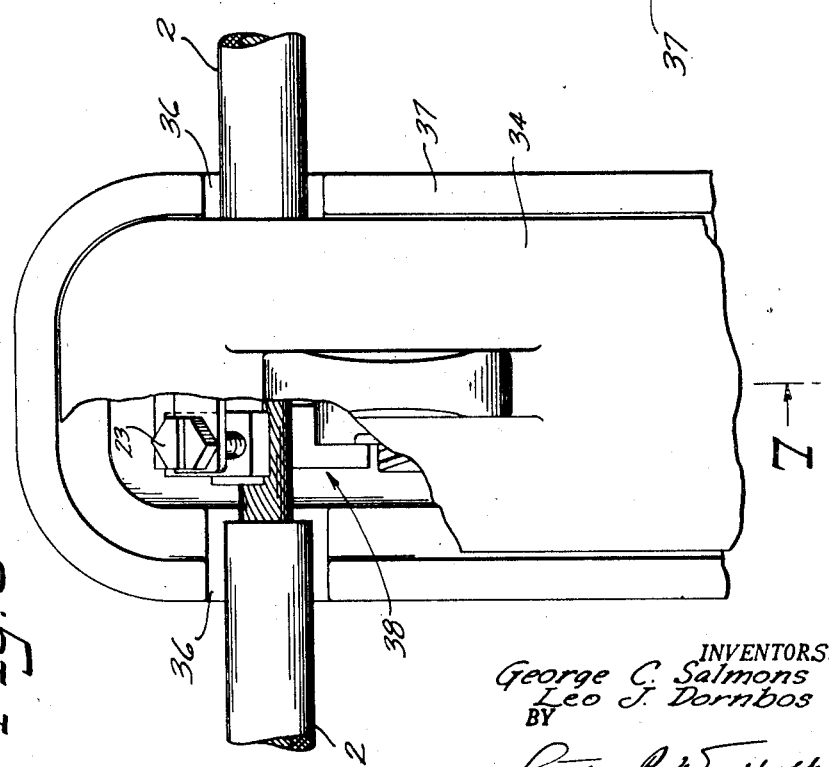
INVENTORS.
George C. Salmons &
Leo J. Dornbos
BY
Arthur R. Woolfolk
Attorney Patented Jan. 4, 1949

2,457,925

UNITED STATES PATENT OFFICE 2,457,925

AERIAL CABLE CUTOUT

George C. Salmons and Leo J. Dornbos, Stroudsburg, Pa., assignors to Line Material Company, Milwaukee, Wis., a corporation of Delaware Application March 17, 1947, Serial No. 735,196

4 Claims. (Cl. 200—114)

1

This invention relates to cutouts and is particularly directed to a cutout construction for an aerial cable.

The present trend in electrical distribution is towards the use of what is called an aerial cable in which one or more cables are bound together by metal tapes or other means and are supported from a messenger wire so that these cables may be passed through trees without danger and also so that they will occupy a smaller amount of room on the supporting poles. In addition to this, there are, of course, many other advantages which do not concern the present invention. However, it is desirable at times to tap a single cable and to install a cutout for that cable. Heretofore it has been necessary to use a considerable amount of additional equipment in order to accomplish the above.

This invention is designed to provide a cutout construction which is particularly suited for use with an aerial cable and which is so made that it is not necessary to cut the cable at all but merely requires the stripping of a small portion of the insulation from the cable and the clamping of the exposed portion of the cable directly to one of the terminals of the cutout structure, the stripped portion being fully housed and protected from the weather.

In greater detail, further objects are to provide a cutout construction which is so made that a portion of the cable may readily be inserted through slots in the housing of the cutout and may be clamped in position out of the way of any of the working parts of the cutout, and to so arrange the housing and its door or closure means that that part of the slots which is not occupied by the cable is substantially closed to thus guard against the entry of birds and also to discourage the entry of insects at this portion of the structure.

Further objects are to provide an aerial cable cutout which is of simple construction, which is very easy to install, and which provides access not only to the cutout itself but also to the clamping means for the stripped portion of the cable.

Embodiments of the invention are shown in the accompanying drawings, in which:

Figure 1 is an elevation showing a fragment of the pole and showing the device attached to the pole and to one of the conductors of an aerial cable.

Figure 2 is a side elevation of the structure shown in Figure 1.

Figure 3 is an enlarged front view of the top portion of the structure shown in Figure 1 with parts broken away.

Figure 4 is a sectional view on the line 4—4 of Figure 3.

Figure 5 is a top fragmentary view of the structure shown in Figure 1 with parts broken away.

Figure 6 is a view corresponding to Figure 4 with parts broken away of a further form of the invention.

Figure 7 is a sectional view on the line 7—7 of Figure 6.

Referring to the drawings, it will be seen that an aerial cable is indicated generally by the reference character 1. This cable comprises either a single or a plurality of individual cables 2, 3, and 4 which are twisted or otherwise grouped together and held to a messenger wire 5 by means of a plurality of metal binding tapes or members 6.

In using the device one of the cables, for instance the cable 2, is unwound from the remaining cables to provide the necessary slack and is bowed inwardly as shown in Figure 1, the messenger wire 5 being held to the pole by means of a suitable supporting bracket 7.

The cutout comprises a housing 8 of porcelain or other suitable insulating material and is secured by means of a bracket structure indicated generally at 9 from the pole 10 or to any other support. This insulating housing 8 is provided with a main door 11 removably hinged to the housing 8 as indicated at 12 in any suitable manner; for example, as disclosed in the United States Patent to William O. Schultz, No. Re. 22,372 of September 7, 1943 for a Fuse. This main door 11 is provided with an eyelet portion 13 adapted to receive a switch stick or other member so that it may be pulled open or pushed closed as required. This housing is also provided with an upper auxiliary door 14 which is hinged to the housing as indicated at 15 so that it may be rocked upwardly as desired to provide access to upper fastening means electrically connected to the upper contact of the cutout as will hereinafter be described in greater detail.

The housing 8 is open at its bottom and at its front and has side walls which are provided with inwardly extending and preferably slightly downwardly slanting slots 16 for the reception of the cable 2 as shown in Figures 1 and 2. The cable is not cut or interrupted. All that is done is that the conducting portion of the cable is bared as indicated at 17 in Figure 3 where it passes through the housing 8. The insulation of the cable is left in place except for a small section which is bared as shown in the figure. This and the adjacent portion of the cable extends into the slots 16. The bared portion of the cable is clamped to the upper terminal assembly indicated generally at 18. The upper terminal assembly may comprise an upper portion 19 which is provided with transversely projecting cable contacting portions 20 and with guiding ears 22 through which the screws 23 or C-clamps 24 extend. The screws 23 are threaded into the body portion of the C-clamps 24 so that when the screws 23 are screwed inwardly, the C-clamps 24 engaged the conductor 17 of the cable and clamp it tightly to the portion 20 of the upper terminal assembly. This upper terminal assembly may comprise spring ears 25 between which the terminal 26 of a drop-out fuse tube 27 is received, a suitable contact spring 28 being provided as a part of the upper terminal assembly 18 and contacting with the upper part of the cap or terminal 26 of the drop-out fuse tube. This drop-out fuse tube and its associated parts may be similar to that disclosed in the above noted patent to William O. Schultz. The fuse tube is slidably supported from the main door 11 and is slidable through a sleeve-like terminal or member 29, shown in dotted lines in Figure 2, and carried by the door 11 and is normally retained in place by means of a fuse link 30, see Figure 4. All of the structure may be similar to that disclosed in the above noted patent to William O. Schultz. The lower stationary terminal is indicated in dotted lines at 31 in Figure 1 and engages the terminal or metal sleeve 29 carried by the door 11. The drop-out fuse tube and fuse link assembly normally electrically connect the line conductor or cable 2 and the load conductor 32. When overload occurs the fuse link 30 is ruptured and the fuse tube drops or slides downwardly to the dotted line position shown in Figure 2 away from the upper stationary terminal indicated generally at 18 in Figures 3 and 4.

The operation of this device is similar to that described in the above noted patent to William O. Schultz.

It is to be noted that the major portion of the slots 16 or, in other words, that portion of such slots which is not occupied by the cable 2 is closed by means of wings 33 formed integrally with the auxiliary or upper door 14. These wings 33 are located interiorly of the housing 8 when the auxiliary door or upper door 14 is closed.

When it is desired to install one of these devices, the upper door 14 is swung upwardly and the cable is passed through the slots 16 without the necessity of interrupting or cutting the cable. When the door 14 is open it is clear that free access is provided for the clamping means or C-clamps 24 and their screws 23 so that the bared portion 17 of the cable 2 may be clamped to the upper terminal. Thereafter the auxiliary or upper door 14 is closed. It need not be opened under any condition except when it is desired to remove the device.

It is to be noted that the wings 33 prevent the entrance of birds at this portion of the apparatus and also discourage the entry of insects into the housing.

It is clear that the main door 11 could be made longer and could, therefore, be made to cover the clamping means for the cable which secures the cable to the upper terminal assembly. For example, as shown in Figures 6 and 7, the main door is indicated by the reference character 34 and is the only door used in this form of the invention. The door 34 is longer than the door 11 hereinbefore described for the first form of the invention and is provided with inwardly projecting ears 35 which close the slots 36 in the side walls of the housing 37. The upper terminal assembly indicated generally at 38 and the remaining portion of the structure are identically like that previously described for the first form of the invention.

In this form of the invention when it is desired to install one of these cutout devices the door 34 is pulled open and access is thus provided to the conductor or cable securing means of the upper terminal assembly 18 so that the cable may be clamped to the upper terminal assembly as hereinabove described. The door 34 is then rocked closed and the device operates as described in connection with the first form of the invention.

It is obvious that if desired the cable may be bared for the entire width of the cutout housing and in this event the slots in the side walls would be made narrower. Obviously the cable could be taped in either instance adjacent the points where it passes through the side walls of the housing.

It will be seen that a novel cutout construction has been provided for an aerial cable which is so made that it is not necessary to cut the cable at all but instead in which all that is necessary is to remove a small portion of the insulation of the cable and to insert the cable into slots in the side walls of the housing of the cutout. Thereafter the cable is clamped to the upper terminal assembly and the device is ready for operation.

While it is primarily intended that this cutout shall be used for high voltage or primary cables, nevertheless, it is obviously possible to use this cutout with low voltage or secondary cables if desired. Also while it is primarily intended that this cutout shall be attached to a pole or other suitable supporting means, it is nevertheless within the province of this invention to support the cutout directly on the cable at least for a temporary installation.

While the device has been illustrated and described as used for a single phase tap on a three phase cable, it is clear that three devices could be employed if three phase service is wished for the branch line. Also it is clear that the device could be used for a single cable as well as a tap on a three phase cable.

Although this invention has been described in considerable detail, it is to be understood that such description is intended as illustrative rather than limiting, as the invention may be variously embodied and is to be interpreted as claimed.

We claim:

1. A cutout construction arranged to normally electrically connect an unbroken line conductor to a load conductor comprising an insulating housing having an open front and having slotted sides with the slots extending inwardly from the front edges of the sides and arranged to allow passage of the unbroken line conductor inwardly of the housing, an upper stationary terminal having fastening means for electrically connecting the unbroken line conductor to the upper stationary terminal, a lower stationary terminal electrically connected to the load conductor, cutout means normally electrically connecting the upper and lower terminals, and a hinged door for said housing arranged to provide access to the fastening means of the upper terminal, said door having wings extending inwardly of said housing when said door is closed and arranged to close that portion of the slots not occupied by the said unbroken line conductor.

2. A cutout construction arranged to normally electrically connect an unbroken line conductor to a load conductor comprising an insulating housing having an open front and slotted sides with the slots extending inwardly from the front edges of the sides to allow passage of the unbroken line conductor inwardly of the housing, an upper stationary terminal having fastening means for electrically connecting the unbroken line conductor to the upper stationary terminal, a lower stationary terminal electrically connected to the load conductor, a main closure means for closing the major portion of the front of the housing, a drop-out fuse assembly carried by said main closure means and movable relative thereto and normally electrically connecting the upper and lower stationary terminals and including a fuse link and a movable fuse tube restrained by said fuse link and having a terminal normally engaging said upper stationary terminal and movable away from said upper stationary terminal when said fuse link is ruptured, and an upper auxiliary closure means for closing the upper portion of the front of said housing and providing access to the fastening means of said upper stationary terminal.

3. A cutout construction arranged to normally electrically connect an unbroken line conductor and a load conductor comprising an insulating housing having an open front and slotted sides with the slots extending inwardly from the front edges of the sides to allow passage of the unbroken line conductor inwardly of the housing, an upper stationary terminal having fastening means for electrically connecting the unbroken line conductor to the upper stationary terminal, a lower stationary terminal electrically connected to the load conductor, a main hinged door normally closing the major part of the front of the housing, a drop-out fuse assembly normally electrically connecting the upper and lower stationary terminals and carried by said main door and including a fuse link normally electrically connecting said upper and lower stationary terminals and a movable fuse tube restrained by said fuse link and having a terminal normally engaging said upper stationary terminal and movable away from said upper stationary terminal when said fuse link is ruptured, and an upper auxiliary hinged door arranged to provide access to the fastening means to said upper stationary terminal.

4. A cutout construction arranged to normally electrically connect an unbroken line conductor and a load conductor comprising an insulating housing having an open front and slotted sides with the slots extending inwardly from the front edges of the sides to allow passage of the unbroken line conductor inwardly of the housing, an upper stationary terminal having fastening means for electrically connecting the unbroken line conductor to the upper stationary terminal, a lower stationary terminal electrically connected to the load conductor, a main hinged door normally closing the major part of the front of the housing, a cutout carried by said main door and electrically connecting the upper and lower stationary terminals, and an auxiliary hinged door arranged to provide access to the fastening means of said upper stationary terminal, said auxiliary hinged door being provided with a pair of wings located inwardly of said housing and arranged to close that portion of the slots in the sides of the housing not occupied by the line conductor, said main hinged door being hinged adjacent its lower end and said auxiliary hinged door being hinged adjacent its upper end and normally overhanging the major portion of the upper stationary terminal.

GEORGE C. SALMONS.
LEO J. DORNBOS.

REFERENCES CITED

The following references are of record in the file of this patent:

UNITED STATES PATENTS

| Number | Name | Date |
|---|---|---|
| Re. 22,372 | Schultz | Sept. 7, 1943 |
| 2,114,745 | McCluskey et al. | Apr. 19, 1938 |
| 2,281,515 | Ruggieri | Apr. 28, 1942 |

Disclaimer 2,457,925.—*George C. Salmons* and *Leo J. Dornbos*, Stroudsburg, Pa. AERIAL CABLE CUTOUT. Patent dated Jan. 4, 1949. Disclaimer filed July 20, 1950, by the assignee, *McGraw Electric Company*.

Hereby enters this disclaimer to claim 1 of said patent.

[*Official Gazette August 15, 1950.*]